(12) United States Patent
Prasad et al.

(10) Patent No.: US 11,728,732 B2
(45) Date of Patent: Aug. 15, 2023

(54) ELECTRICAL SYSTEM HAVING BUCK CONVERTER FUNCTIONALITY

(71) Applicant: GM Global Technology Operations LLC, Detroit, MI (US)

(72) Inventors: Rashmi Prasad, Troy, MI (US); Chandra S. Namuduri, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 156 days.

(21) Appl. No.: 17/208,134

(22) Filed: Mar. 22, 2021

(65) Prior Publication Data

US 2022/0302835 A1    Sep. 22, 2022

(51) Int. Cl.
*H02M 3/158* (2006.01)
*B60L 50/11* (2019.01)

(52) U.S. Cl.
CPC ............. *H02M 3/158* (2013.01); *B60L 50/11* (2019.02); *B60L 2210/12* (2013.01); *B60L 2210/44* (2013.01)

(58) Field of Classification Search
CPC ..... H02M 3/158; B60L 50/11; B60L 2210/12; B60L 2210/44
See application file for complete search history.

(56) References Cited

U.S. PATENT DOCUMENTS

| | | | |
|---|---|---|---|
| 4,588,933 A | 5/1986 | Sun | |
| 6,909,201 B2 | 6/2005 | Murty et al. | |
| 7,919,949 B2 | 4/2011 | Namuduri et al. | |
| 8,432,126 B2 | 4/2013 | Hasan et al. | |
| 8,606,447 B2 | 12/2013 | Namuduri et al. | |
| 9,118,210 B2 | 8/2015 | Namuduri et al. | |
| 9,153,974 B2 | 10/2015 | Reynolds et al. | |
| 9,387,766 B2 | 7/2016 | Hao et al. | |
| 9,452,672 B2 | 9/2016 | Namuduri et al. | |
| 9,573,454 B2 | 2/2017 | Holmes et al. | |
| 9,621,099 B1 | 4/2017 | Namuduri et al. | |
| 9,657,705 B2 | 5/2017 | Holmes et al. | |
| 9,868,410 B2 | 1/2018 | Namuduri et al. | |
| 9,882,521 B2 | 1/2018 | Namuduri et al. | |
| 9,973,028 B2 | 5/2018 | Namuduri et al. | |
| 10,189,470 B2 | 1/2019 | Atluri et al. | |
| 10,259,448 B2 | 4/2019 | Bucknor et al. | |
| 10,369,900 B1 * | 8/2019 | Conlon | B60L 58/12 |
| 10,432,130 B2 | 10/2019 | Namuduri et al. | |
| 10,605,217 B2 | 3/2020 | Namuduri et al. | |
| 10,917,030 B1 | 2/2021 | Hao et al. | |
| 2008/0173017 A1 | 7/2008 | James | |

(Continued)

FOREIGN PATENT DOCUMENTS

CN    111347893 A    6/2020

*Primary Examiner* — Rafael O De Leon Domenech
(74) *Attorney, Agent, or Firm* — Vivacqua Crane, PLLC

(57) ABSTRACT

An example electrical system is disclosed. The electrical system can include a rechargeable energy storage system (RESS) and a power inverter connected to the RESS. The power inverter can be configured to provide electrical power to an electric machine. A switch can be disposed between the plurality of machine windings and an output load. The switch is configured to transition between a closed state to allow current flow from the RESS through the inverter and the plurality of machine windings to the output load and an open state to prevent current flow to the output load.

20 Claims, 8 Drawing Sheets

(56) References Cited

U.S. PATENT DOCUMENTS

| | | |
|---|---|---|
| 2009/0184681 A1 | 7/2009 | Kuno |
| 2010/0188071 A1 | 7/2010 | Kajouke |
| 2012/0306424 A1 | 12/2012 | Naik et al. |
| 2014/0239876 A1 | 8/2014 | Hao et al. |
| 2016/0152153 A1 | 6/2016 | Yang et al. |
| 2016/0185225 A1 | 6/2016 | Namuduri et al. |
| 2018/0050686 A1 | 2/2018 | Atluri et al. |
| 2018/0351398 A1 | 12/2018 | Tang et al. |
| 2019/0061537 A1* | 2/2019 | Ge .................. B60L 50/51 |
| 2019/0160953 A1 | 5/2019 | Namuduri et al. |
| 2019/0255953 A1* | 8/2019 | Conlon .................. B60L 53/14 |
| 2020/0070667 A1* | 3/2020 | Wang .................. B60L 53/11 |
| 2021/0044135 A1 | 2/2021 | Lee et al. |
| 2022/0297555 A1 | 9/2022 | Prasad et al. |
| 2022/0297557 A1 | 9/2022 | Prasad et al. |
| 2022/0302835 A1 | 9/2022 | Prasad et al. |
| 2022/0302836 A1 | 9/2022 | Prasad et al. |
| 2022/0302867 A1 | 9/2022 | Prasad et al. |

* cited by examiner

ELECTRICAL SYSTEM HAVING BUCK CONVERTER FUNCTIONALITY

INTRODUCTION

The present disclosure relates to relates to a vehicle electrical system having buck conversion functionality.

A hybrid electric or battery electric vehicle transmission typically includes one or more high-voltage machine electric machines in the form of a motor generator unit or an electric traction motor. Electric machines deliver/charge power to or draw power from a rechargeable direct current (DC) battery pack. The energized electric machines adjust torques of the various gear sets of the transmission to achieve optimal system efficiency. A voltage converter is typically used to convert a battery output voltage to a level suitable for use by the electric machines and/or accessory loads in the vehicle.

Semiconductor switches of a power inverter module are controlled via pulse-width modulation or other switching control signals to convert the battery output voltage to an alternating current (AC) output voltage. The AC output voltage from the power inverter module is ultimately transmitted to the individual phase windings of the electric machine. The energized electric machine powers the drivetrain of the vehicle.

SUMMARY

An example electrical system is disclosed. The electrical system can include a rechargeable energy storage system (RESS) and a power inverter connected to the RESS. The power inverter can be configured to provide electrical power to an electric machine. A switch can be disposed between the plurality of machine windings and an output load. The switch is configured to transition between a closed state to allow current flow from the RESS through the inverter and the plurality of machine windings to the output load and an open state to prevent current flow to the output load.

In other features, the electrical system includes an inductor connected in series between the plurality of machine windings and the accessory load, wherein the inductor is configured to mitigate at least one of current ripple or torque ripple.

In other features, the power inverter comprises a set of semiconductor switches that are configured to convert direct current (DC) power to alternating current (AC) power.

In other features, each semiconductor switch of the set of semiconductor switches comprises a voltage-controlled switching device.

In other features, the voltage-controlled switching device comprises at least one of a silicon insulated gate bipolar transistor (IGBT), a silicon carbide metal-oxide semiconductor field effect transistor (MOSFET), a silicon superjunction MOSFET, a Gallium nitride (GaN) field-effect transistor (FET), a SiC junction-gate field-effect transistor (JFET), a wideband-gap (WBG) device, or an ultra-wideband-gap device (UWBG).

In other features, the power inverter comprises a plurality of phase legs, each phase leg of the plurality of phase legs comprising a pair of semiconductor switches of the set of semiconductor switches, wherein each phase leg is connected to a corresponding phase terminal of the plurality of machine windings of the traction motor.

In other features, current flows through at least two-phase windings of the plurality of machine windings to cause a voltage from the RESS to step down from a first voltage to a second voltage due to pulse-width modulation of the corresponding phase legs.

In other features, the output load comprises at least one of a vehicle or an accessory load.

In other features, the switch comprises at least one of a contactor or a solid-state relay.

An example electrical system is disclosed. The electrical system can include a rechargeable energy storage system (RESS) and a power inverter connected to the RESS. The power inverter can be configured to provide electrical power to an electric machine. The electrical system can include a plurality of machine windings of the traction motor. A switch can be disposed between the plurality of machine windings and an output load. The electrical system includes a controller connected to the switch and to a power inverter controller. The controller is configured to transmit control signals to the power inverter controller and to the switch to allow current flow from the RESS through the plurality of machine windings to the output load during a first operational state and to prevent current flow to the output load during a second operational state.

In other features, the electrical system includes an inductor connected in series between the plurality of machine windings and the accessory load, wherein the inductor is configured to mitigate current ripple.

In other features, the power inverter comprises a set of semiconductor switches that are configured to convert direct current (DC) power to alternating current (AC) power.

In other features, each semiconductor switch of the set of semiconductor switches comprises a voltage-controlled switching device.

In other features, the voltage-controlled switching device comprises at least one of a silicon insulated gate bipolar transistor (IGBT), a silicon carbide metal-oxide semiconductor field effect transistor (MOSFET), a silicon superjunction MOSFET, a Gallium nitride (GaN) field-effect transistor (FET), a SiC junction-gate field-effect transistor (JFET), a wideband-gap (WBG) device, or an ultra-wideband-gap device (UWBG).

In other features, the power inverter comprises a plurality of phase legs, each phase leg of the plurality of phase legs comprising a pair of semiconductor switches of the set of semiconductor switches, wherein each phase leg is connected to a corresponding phase terminal of the plurality of machine windings of the traction motor.

In other features, current flows through at least two-phase windings of the plurality of machine windings to cause a voltage from the RESS to step down from a first voltage to a second voltage due to pulse-width modulation of the corresponding phase legs.

In other features, the controller receives software updates via over-the-air programming.

In other features, the switch comprises at least one of a contactor or a solid-state relay.

A method is disclosed that includes determining whether a DC-DC buck mode selection has been received. The method also includes transmitting at least one control signal to power inverter and to a switch to allow current flow from a rechargeable energy storage system (RESS) through a plurality of machine windings to an output load during a first operational state and to prevent current flow between the RESS and the plurality of machine windings during a second operational state based on the determination.

In other features, the power inverter comprises a set of semiconductor switches that are configured to convert direct current (DC) power to alternating current (AC) power.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Some hybrid electric or battery electric vehicles may include native onboard rechargeable energy storage systems (RESS) that store voltage that is greater than a voltage to support the vehicle's accessory loads. In these instances, the vehicle may require an additional DC-DC converter to step down the voltage from the RESS to the accessory loads. Additional DC-DC converters can result in an increase in cost, mass, and volume of the vehicle.

The present disclosure describes an electrical system that provides buck converter functionality via inverter switches and machine windings during vehicle charging. For example, a controller can selectively transition one or more switches from an open state to a closed state, or vice versa, to cause electrical power to be directed from the RESS to the accessory loads. The electrical power can be directed through an inverter to the electric machine windings such that the voltage is stepped down relative to the voltage of the RESS. The electrical system can also be used when performing vehicle-to-vehicle (V2V) charging when a vehicle providing power includes a relatively higher voltage native system than a vehicle having a relatively lower voltage native system.

Figure 1A:
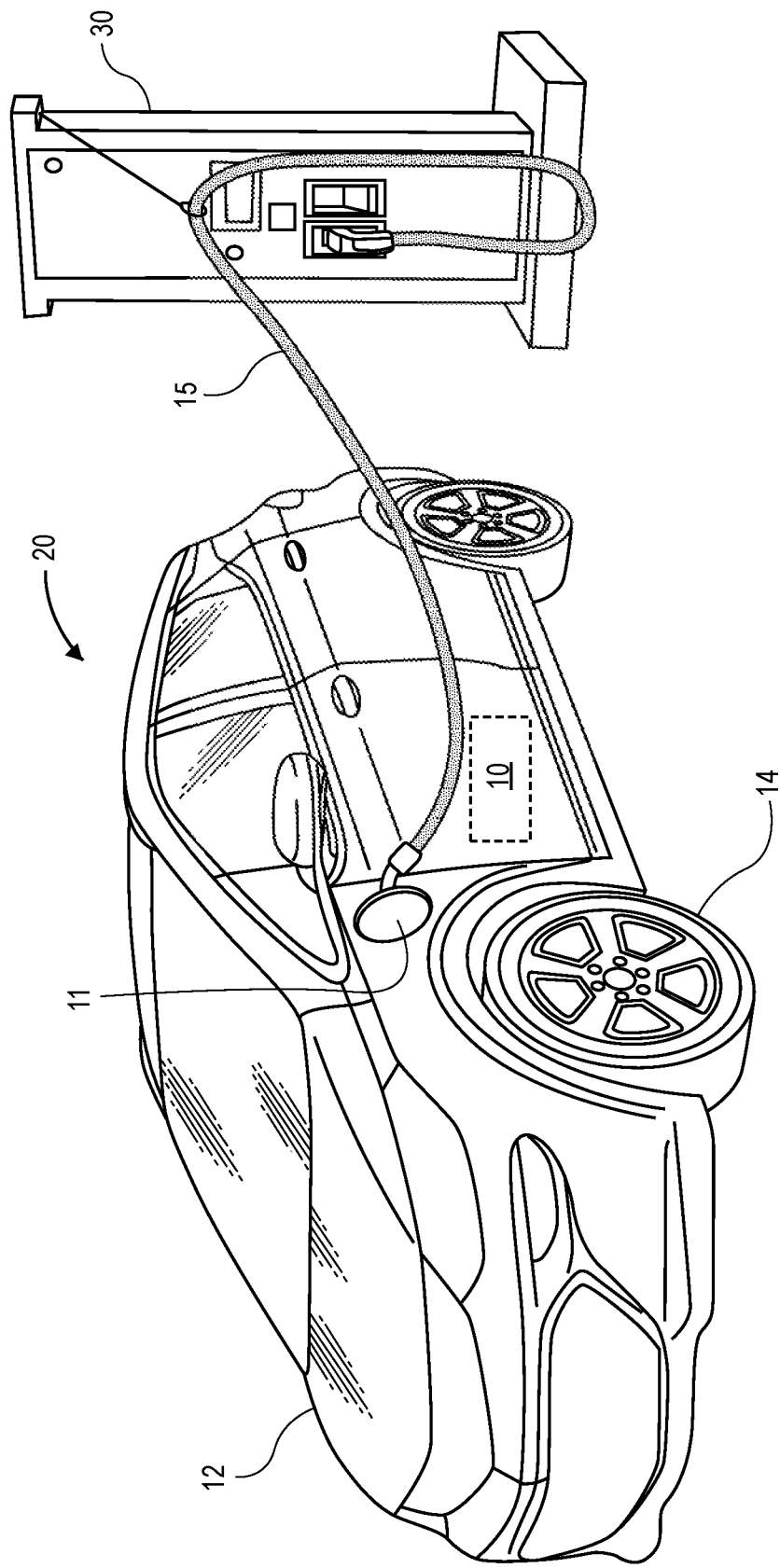
FIG. 1A is a schematic illustration of an example motor vehicle connected to an off-board DC fast-charging station.

FIG. 1A illustrates an example direct current (DC) charging circuit 10 as part of a motor vehicle 20. The vehicle 20 is depicted as undergoing a DC fast-charging operation in which the DC charging circuit 10 is electrically connected to an off-board DC fast-charging station 30 via a charging port 11 and a charging cable 15, e.g., using an SAE J1772 charge connector, CHAdeMO, or another suitable regional or national standard charging plug or connector. The present teachings are independent of the particular charging standard that is ultimately employed in a DC fast-charging operation involving the DC fast-charging station 30, and thus the above-noted examples are merely illustrative.

The DC charging circuit 10 may be used as part of the motor vehicle 20, as well as other electrical systems such as stationary or mobile power plants robots or platforms. For vehicular applications, non-motor vehicles such as aircraft, marine vessels, and rail vehicles may enjoy similar benefits. The DC charging circuit 10 may be used as part of a powertrain of a mobile system, such as the example vehicle 20. For illustrative consistency, an application of the DC charging circuit 10 as an integral part of the vehicle 20 in a motor vehicle context will be described hereinafter without limiting the present disclosure to such an implementation.

Figure 1B:
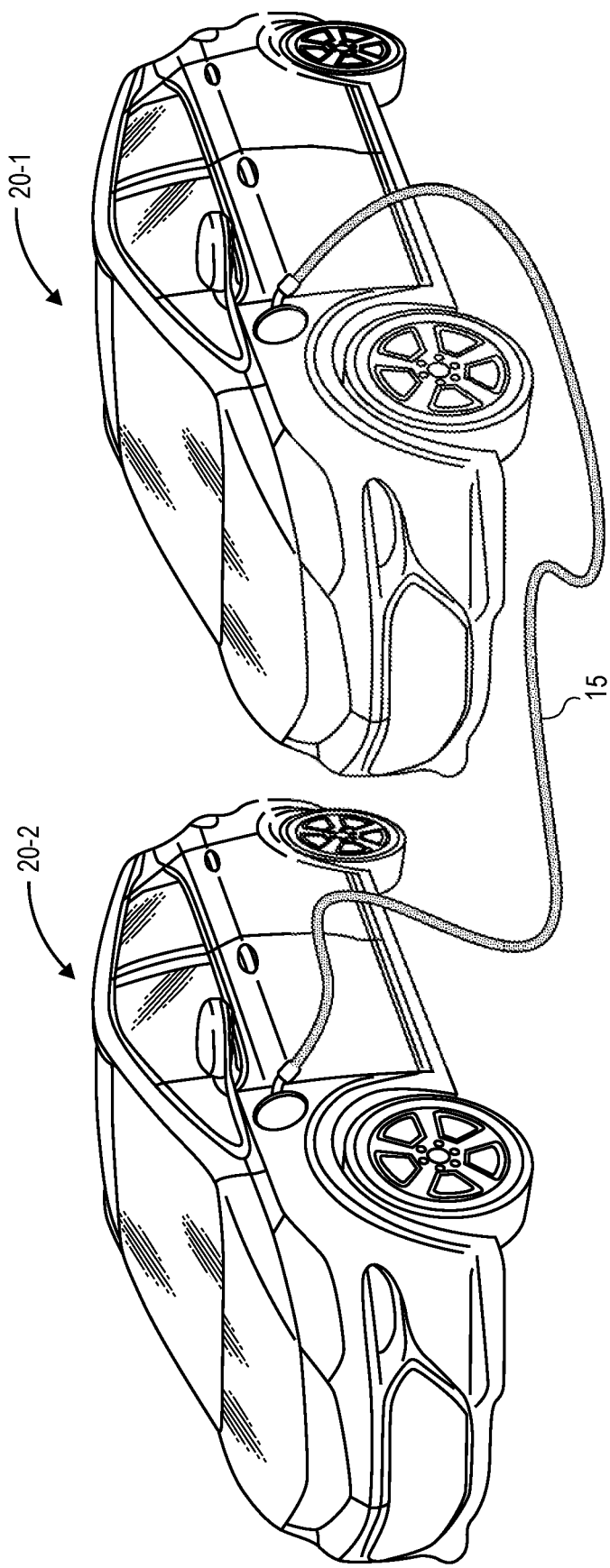
FIG. 1B is a schematic illustration of an example motor vehicle connected to another motor vehicle.

The vehicle 20 of FIG. 1A includes a body 12 and drive wheels 14. The body 12 may define or include the charging port 11 at a user-accessible location. The vehicle 20 may be variously embodied as a plug-in electric vehicle having onboard rechargeable energy storage system (RESS) 115 as shown in FIG. 2 and described below, e.g., a multi-cell lithium ion, zinc-air, nickel-metal hydride, or lead acid direct current battery pack that can be selectively recharged using the off-board DC fast-charging station 30 of FIG. 1A. The DC charging circuit 10, as best depicted in FIG. 2, incorporates powertrain/traction drive components of the vehicle 20 whose ordinary functions may include powering an electric machine, e.g., a traction motor 114, to generate and deliver motor torque to the drive wheels 14 for propulsion of the vehicle 20, or for performing other useful work aboard the vehicle 20. FIG. 1B illustrates an example implementation of vehicle-to-vehicle (V2V) charging. As shown, a first vehicle 20-1 may be used to at least partially charge a second vehicle 20-2, or vice versa. The first vehicle 20-1 and/or the second vehicle 20-2 may include an electrical system as described herein.

Figure 2A:
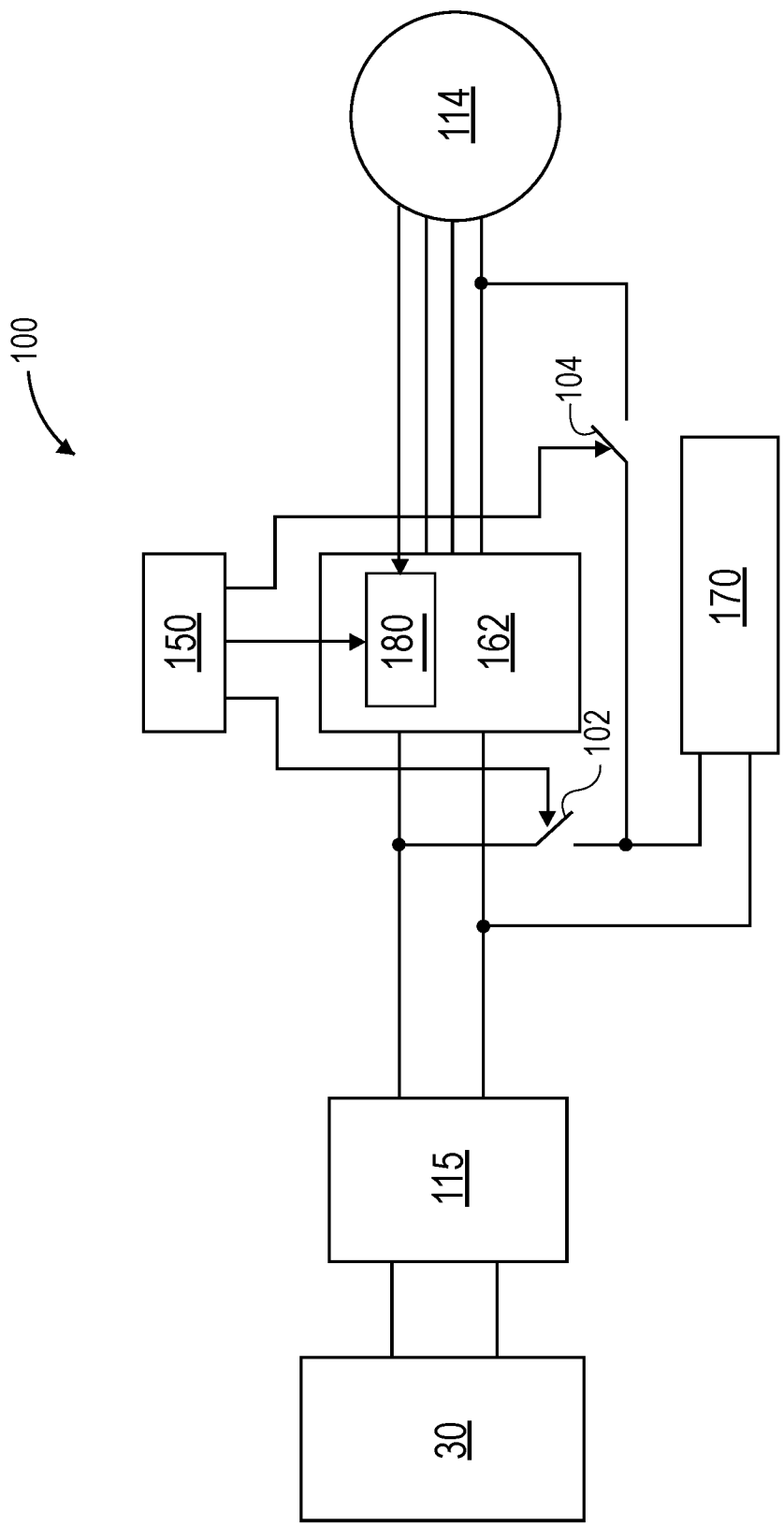
FIG. 2A is a block diagram of an example electrical system according to an example implementation.
Figure 3A:
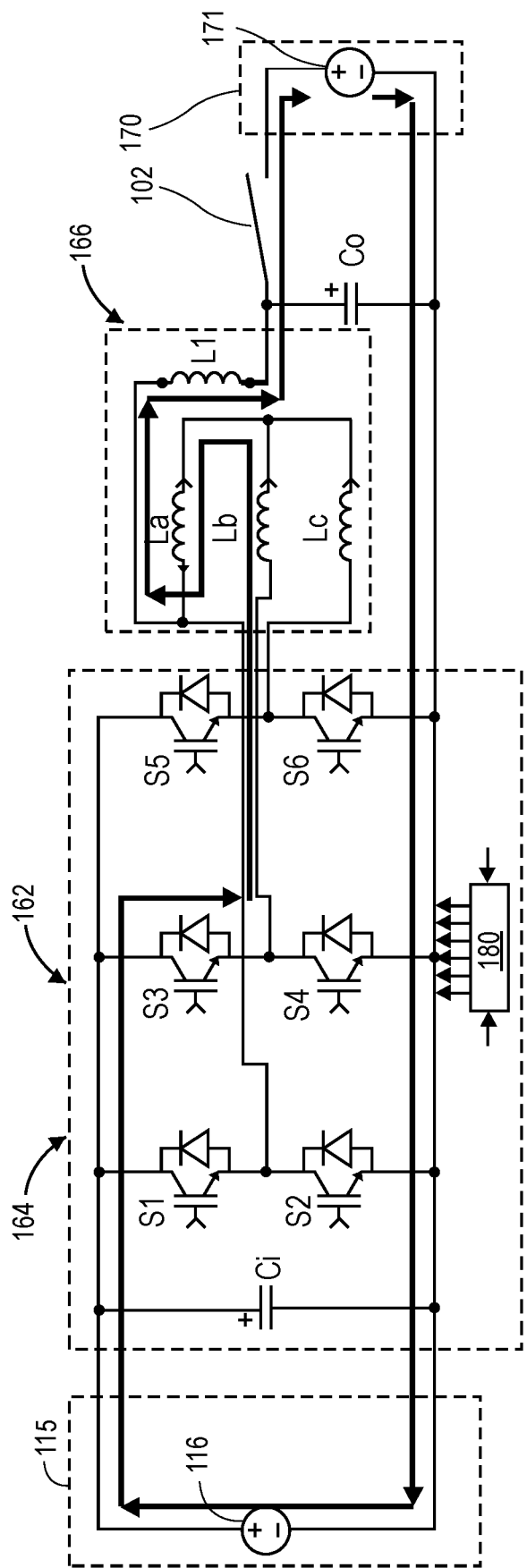
FIGS. 3A and 3B are circuit schematics of the example electrical system according to various implementations.
Figure 3B:
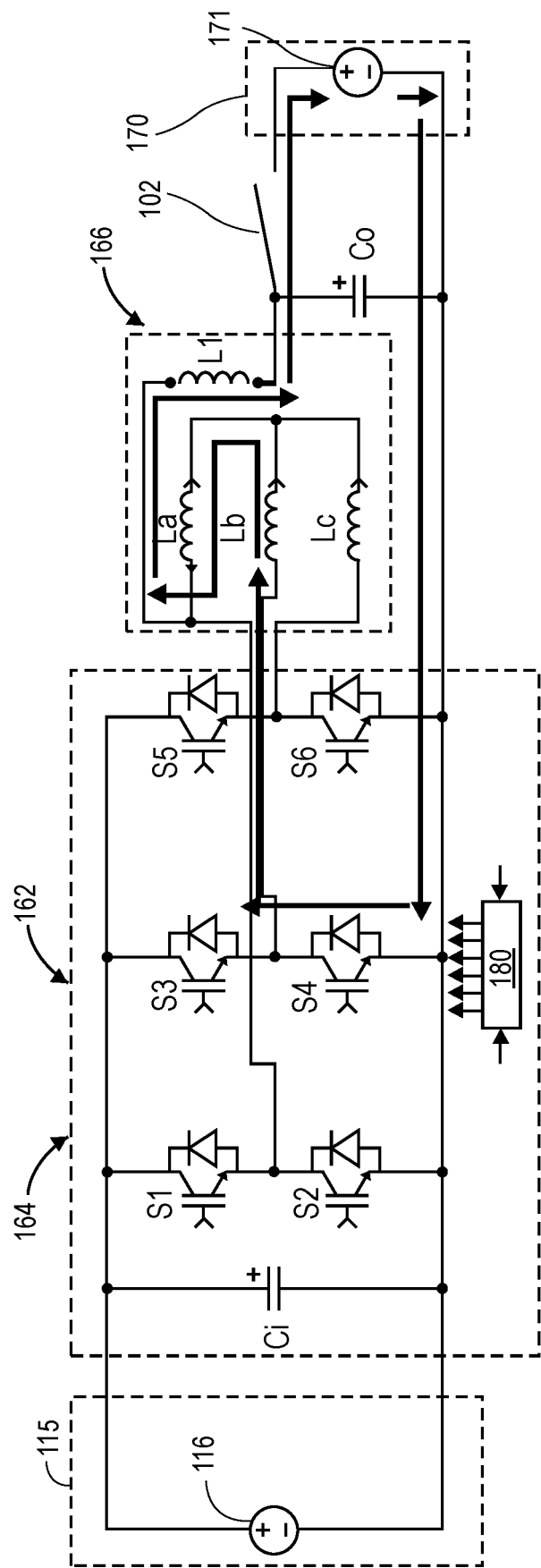
Figure 4:
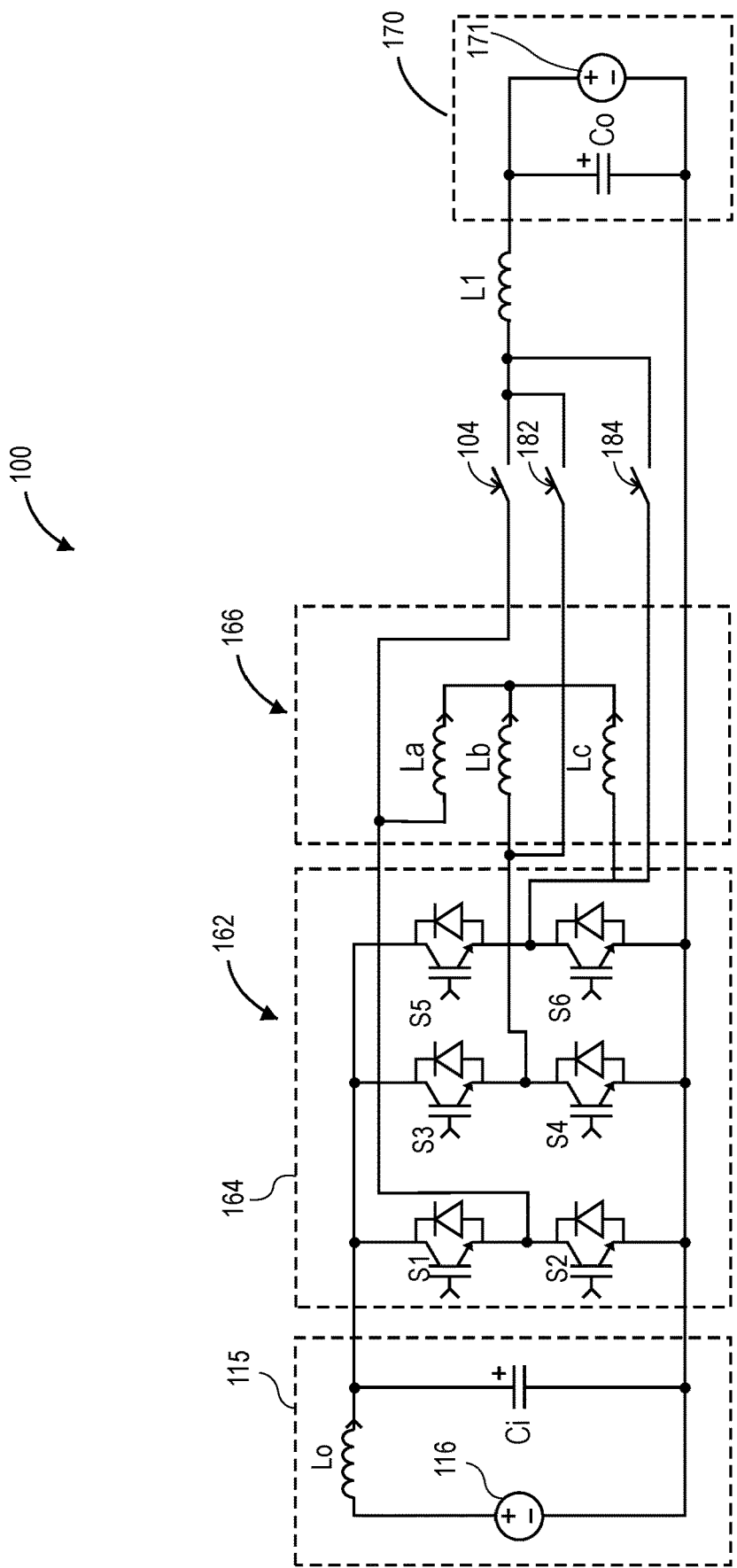
FIG. 4 is a circuit schematic of the example electrical system another example implementation.

FIG. 2A illustrates a block diagram of an example implementation of an electrical system 100 for the vehicle 20. As shown, the electrical system 100 includes the onboard rechargeable energy storage system (RESS) 115 adapted for storing high-voltage electrical energy used for propelling an electric-drive vehicle, such as the vehicle 20 of FIG. 1A. RESS 115 may be a deep-cycle, high-ampere capacity battery system rated for approximately four hundred (400) to approximately eight hundred (800) volts direct current (VDC) or more, for example, depending on a desired vehicle range, gross vehicle weight, and power ratings of the various loads drawing electrical power from the RESS 115. It is understood that the voltages described herein are merely examples and not meant to restrict the electrical system to these voltages. A DC link capacitor Ci can be connected across positive and negative terminals as illustrated in FIGS. 3A through 4. The electrical system 100 can be configured to provide power to one or more output loads, such as another vehicle as shown in FIG. 1B or an accessory load 170 as discussed herein.

The RESS 115 may include one or more high-voltage, independently rechargeable battery packs. The RESS 115 may be connected a high-voltage DC bus bar 160 and a power inverter 162 for governing the transmission of electrical energy to and from the traction motor 114.

The vehicle 20 may further include one or more accessory loads 170, and the one or more accessory loads 170 may be represented as Vload 171. As shown in FIGS. 3A and 3B, a filter capacitor Co may be connected across Vload 171. In an example implementation, the accessory loads 170 can comprise various loads that draw electrical power from the electrical system 100. In this implementation, the accessory loads 170 may require a voltage that is less than a voltage stored by the RESS 115. In one example implementation, the RESS 115 may be adapted to store voltage at a first voltage, such as approximately eight hundred (800) VDC, and the accessory loads 170 may require a second voltage that is less than the first voltage, such as approximately four hundred (400) VDC.

The electrical system 100 further includes a controller 150, a first switch 102, and a second switch 104 to control a buck DC-DC operation for delivering electrical power to the accessory loads 170 from the RESS 115 as shown in FIG. 2A. The switches 102, 104 may comprise contactors or solid-state relays that are adapted to close under electrical load so as to ensure the instantaneous or near instantaneous delivery of electrical power to the vehicle's propulsion system and to drive any number of in-vehicle accessories. While FIG. 2A illustrates switches 102, 104, it is understood that the switches 102, 104 may be replaced with a Single Pole Double Throw (SPDT) switch in some implementations.

The controller 150 can include at least one processor and sufficient memory for storing computer-readable instructions. The memory includes tangible, non-transitory memory, e.g., read only memory, whether optical, magnetic, flash, or otherwise. The controller 150 also includes sufficient amounts of random-access memory, electrically erasable programmable read only memory, and the like, as well as a high-speed clock, analog-to-digital and digital-to-analog circuitry, and input/output circuitry and devices, as well as appropriate signal conditioning and buffer circuitry. The controller 150 can receive charging request signals from one or more electronic control units (ECUs) of the vehicle 20. For example, an ECU associated with one or more of the accessory loads 170 may provide a signal indicating that the accessory loads 170 require electrical power, and the controller 150 can initiate the buck DC-DC operation as discussed in greater detail below.

As shown in FIGS. 2A through 4, the electrical system 100 further includes an inverter controller 180 that controls operation of semiconductor switches S1 through S6 of the power inverter 162, which are described in greater detail below with respect to FIGS. 3A through 4. The inverter controller 180 can include at least one processor and sufficient memory for storing computer-readable instructions. The memory includes tangible, non-transitory memory, e.g., read only memory, whether optical, magnetic, flash, or otherwise. The inverter controller 180 also includes sufficient amounts of random-access memory, electrically erasable programmable read only memory, and the like, as well as a high-speed clock, analog-to-digital and digital-to-analog circuitry, and input/output circuitry and devices, as well as appropriate signal conditioning and buffer circuitry.

In an example implementation, the inverter controller 180 can receive signals from the controller 150 and/or from sensors within the traction motor 114. For example, the traction motor 114 can include phase current sensors and/or rotor position sensors and provide signals indicative of a phase current and/or a position of the rotor, respectively. The inverter controller 180 can control the semiconductor switches S1 through S6 by supplying a signal to one or more gates to cause the semiconductor switches S1 through S6 to transition between an open state and a closed state, as discussed in greater detail below.

Figure 2B:
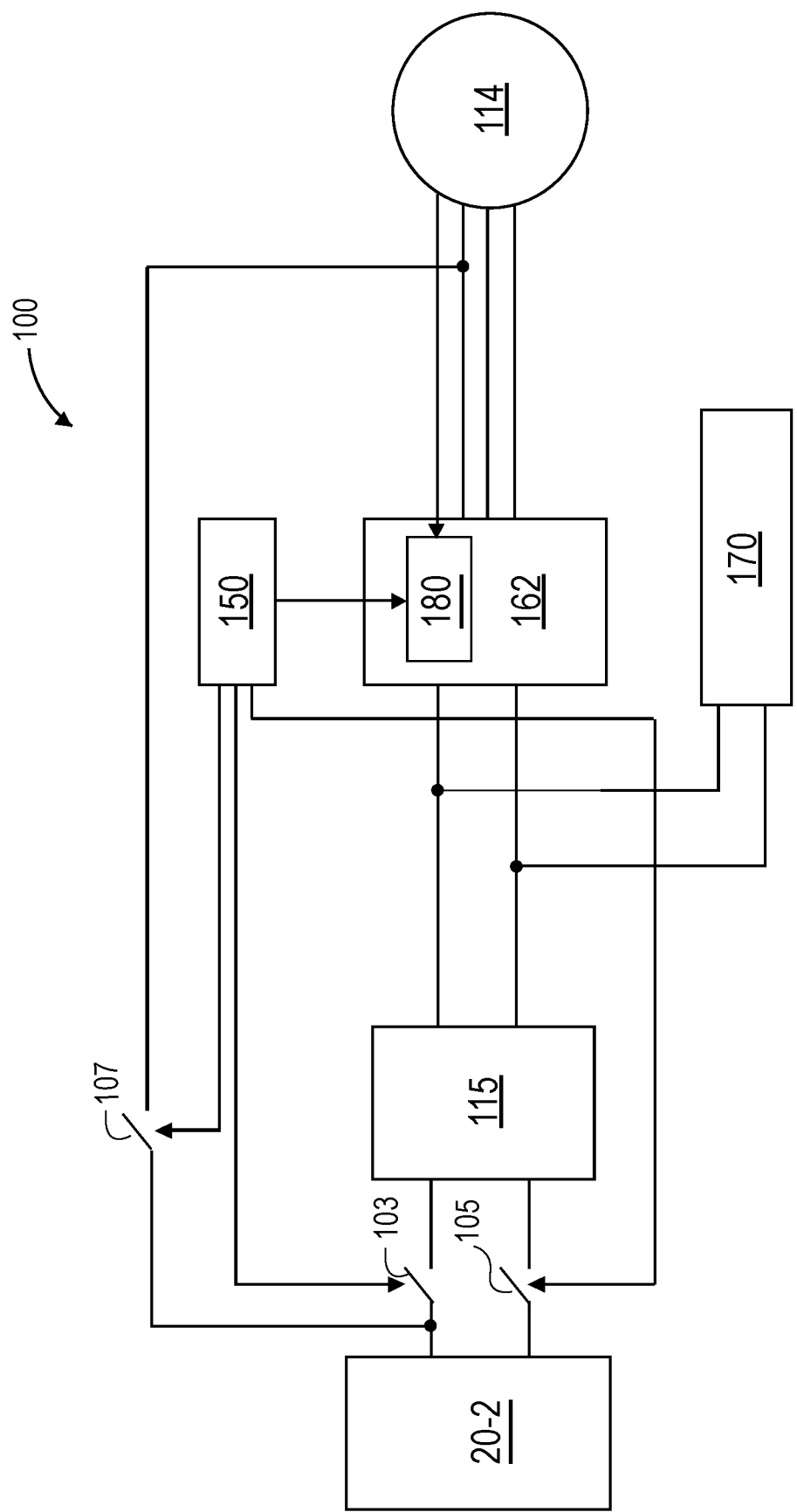
FIG. 2B is a block diagram of an example electrical system according to another example implementation.

FIG. 2B illustrates another example implementation of the electrical system 100 in which power is provided to a vehicle 20-2. In this example, the RESS 115 stores voltage at a first voltage, such as approximately eight hundred (800) VDC, and the vehicle 20-2 may require a second voltage that is less than the first voltage, such as approximately four hundred (400) VDC. The controller 150 can control operation of switches 103, 105, and 107. For example, during a buck DC-DC operation, the switches 105 and 107 are in a closed state while the switch 103 is in an open state. Otherwise, in a non-buck DC-DC operation, the switches 103 and 105 are in the closed state while the switch 107 is in the open state.

FIGS. 3A and 3B illustrate example schematics of the electrical system 100. The power inverter 162 can comprise a DC-to-AC and AC-to-DC power inverter, which may be part of a traction power inverter module (TPIM), that connects via machine windings 166 of the traction motor 114 to transmit electrical energy between the traction motor 114 and RESS 115. The machine windings 166 are illustrated as machine windings La, Lb, and Lc and can provide three-phase current to create a rotating magnetic field to rate a rotor of the traction motor 114. The power inverter 162 may incorporate multiple phases and respective motor control modules operable to receive motor control commands and control inverter states therefrom for providing motor drive or regenerative functionality.

The power inverter 162 may comprise a set 164 of semiconductor switches S1 through S6 (also referred to herein as "inverter switches") that cooperatively convert direct current (DC) power from the RESS 115 to alternating current (AC) power for powering the traction motor 114 via high frequency switching in motoring mode. Each semiconductor switch S1 through S6 may be embodied as a voltage-controlled switching device in the form of a silicon insulated gate bipolar transistor (IGBT), a silicon carbide (SiC) metal-oxide semiconductor field effect transistor (MOSFET), a silicon (Si) superjunction MOSFET, a Gallium nitride (GaN) field-effect transistor (FET), a SiC junction-gate field-effect transistor (JFET), other wideband-gap (WBG) or ultra-wideband-gap semiconductor power switching devices (UWBG), or other suitable switch having a corresponding gate to which a gate signal is applied to change the on/off state of a given switch. There is typically at least one pair of semiconductor switches for each phase of the three-phase traction motor 114. Each pair of switches, e.g., switches S1 and S2 (Phase A), switches S3 and S4 (Phase B), and switches S5 and S6 (Phase C), may referred to as phase legs of the power inverter 162. For example, the power inverter 162 may include at least three (3) phase legs in an example implementation. Each phase leg of the power inverter 162 is connected to a corresponding machine phase terminal, e.g., one of the machine windings 166.

As shown in FIG. 3A, the RESS 115 can be adapted to provide electrical power to the accessory loads 170 during charging. The battery pack 116 may be adapted to store voltage at the first voltage, which is a higher voltage than the second voltage as discussed above. During this operational state, the switches S1 and S2 are in an open state to prevent current flow from the first voltage (battery pack). Switches S3 and S5 of Phase B and Phase C (see FIG. 3A) are subjected to PWM at a duty cycle and phase shift between the two legs to provide reduced voltage to the load or battery of a receiving vehicle, e.g., V2V charging operation, across the output filter capacitor C0. In this operational state, switches S4 and S6 of Phase B and Phase C are in an open state. In the instance of the implementation shown, switch S3 and switch 104 are in the closed state to allow current flow from the RESS 115 to the accessory loads 170 via machine windings Lb, La, and filter inductor L1. The machine windings 166, e.g., phase windings, in conjunction with the inverter phase leg switches can reduce the voltage from the first voltage to the second voltage performing a buck conversion. The filter inductor L1 can be positioned in series with the machine windings 166 to reduce, e.g., mitigate, current ripple as well as machine torque ripple. It is understood that the filter inductor may be optional in some implementations. As shown in FIG. 3A, each machine winding La, Lb, Lc is connected to a corresponding phase leg of the power inverter 162.

It is understood that the current should flow through at least two phases, e.g., at least windings La and Lb, at least windings La and Lc, or at least windings Lb and Lc, of the plurality of machine windings to cause a voltage from the RESS 115 to step down from a first voltage to a second voltage. The switches S3 and/or S5 can be subjected to a pulse-width-modulation signal from the inverter controller 180 to transition switches S3 and S5 between the open state and the closed state. In an example implementation, the duty cycle may comprise fifty percent (50%). FIG. 3B illustrates another operational state in which each of the switches S1, S3, and S5 are in the open state to prevent current flow from the RESS 115 to the accessory loads 170, allowing the current in the windings to freewheel through the bottom switch diodes. During this operational state, the switch 102 is in the open state. Switches can be IGBTs with antiparallel diodes or Si/SiC/GaN FETs. In case of FETs with body diodes, the low side switches (S4 or S6) in the active phases are turned ON during the time the high side switches (S3 or S5) are OFF with a predetermined dead time.

In some implementations, software for the controller 150 may be updated based via over-the-air programming. For example, software updates can be transmitted to the controller 150 via one or more suitable communication networks from a data source, such as an original equipment manufacturer (OEM). The over-the-air updates can provide desired parameters to adjust charging power by adjusting the inverter control signals, e.g., current command, frequency, duty cycle, phase shift, etc., for one or more switches S1 to S6 according to a charging power level via the inverter controller 180.

FIG. 4 illustrates another example implementation of the electrical system 100. As shown, the electrical system 100 can include switches 182 and 184. Similar to the switch 104, the switches 182 and 184 can comprise contactors or solid-state relays. The switches 182 and 184 are controllable by the controller 150 such that current flow can be selectively directed according to a particular phase of operation. The inverter controller 180 may selectively control the switches S1 through S6 and the controller 150 can control the switches 104, 182, and 184 based on a desired vehicle charging operation, e.g., mitigate torque disturbance during the buck operation and/or improve buck converter functionality. In some implementations, the controllers 150 and/or the inverter controller 180 may include a lookup table that relates charging input to vehicle charging criteria.

Figure 5:
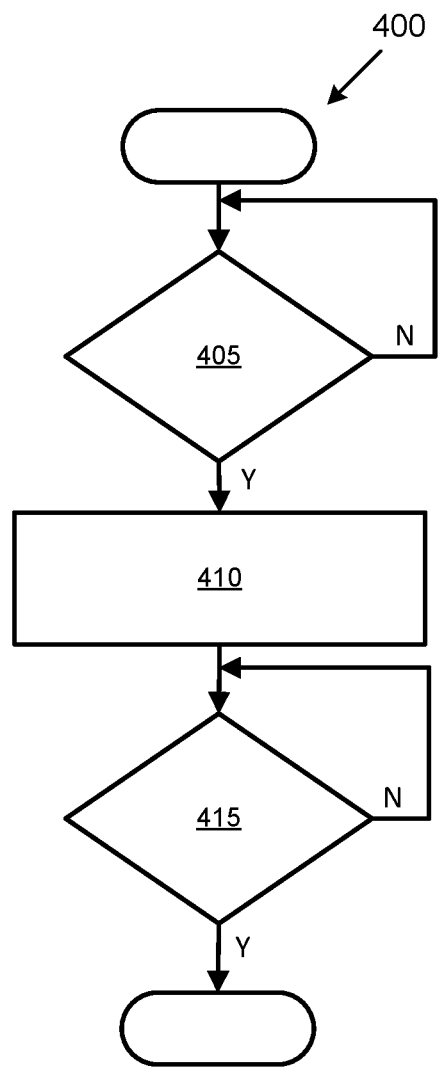
FIG. 5 is a flow chart illustrating an example process for providing power to an accessory load of a vehicle via the electrical system.

FIG. 5 is a flowchart of an exemplary process 400 for providing power to one or more output loads, e.g., the accessory loads 170 and/or another vehicle, via the RESS 115. Blocks of the process 400 can be executed by the controller 150 and/or the inverter controller 180. At block 405, a determination is made whether a DC-DC Buck mode selection signal is received. For example, one or more ECUs associated with the accessory loads 170 or another vehicle may send a signal to the controller 150 indicating the accessory loads 170 or the other vehicle require to be powered. If the signal has not been received, the 400 returns to block 405.

If the charge signal is received, the controller 150 transmits one or more control signals to the inverter 162, e.g., the inverter controller 180, and/or the switches 102, 104 at block 410. Based on the control signals, the inverter controller 180 can generate voltage signals that cause the switches S1 through S6 of the inverter 162. The control signals from the controller 150 can also cause the switches 102, 104 to transition to a desired operating state, e.g., the open state or the closed state. For example, the switch 102 may be transitioned to the open state to prevent current flow from the RESS 115 to the accessory loads 170. In this example, the switches S1, S2, S4, and S6 may also be in the open state while the switches S3 and S5 are pulse-width-modulated to allow current flow from the RESS 115 to the accessory loads 170 through machine windings Lb or Lc, winding La, and inductor L1. As discussed above, the inverter 162 and the machine windings 166 function as a buck converter by causing the current to flow from the inverter 162 through the machine windings 166, which reduces the voltage from the first voltage, e.g., 800V, to the second voltage, e.g., 400V. In this example, the switch 104 is also in the closed state to provide a connection between the accessory loads 170 and the machine windings 166.

At block 415, the controller 150 determines whether a terminate charge signal has been received. If the controller 150 has not received the terminate charge signal from one or more ECUs associated with the accessory loads 170, the process 400 returns to block 415. Otherwise, the controller 150 and/or the inverter controller 180 transmits signals to transition the switches S1 through S6 and the switches 102, 104 to cause the RESS 115 to deliver power to the traction motor 114. The process 400 then ends.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An electrical system, comprising:
a rechargeable energy storage system (RESS);
a power inverter connected to the RESS, the power inverter configured to provide electrical power to a traction motor;
a plurality of machine windings of the traction motor; and
a switch disposed between the plurality of machine windings and an output load, wherein the switch is configured to transition between a closed state to allow current flow from the RESS through two of the plurality of machine windings in series to transfer an energy stored in the two of the plurality of machine windings to the output load, wherein the two of the plurality of machine windings includes at least one of: an La winding and an Lb winding, the La winding and an Lc winding, and the Lb winding and the Lc winding, and an open state to prevent current flow to the output load.

2. The electrical system of claim 1, further comprising an inductor connected in series between the plurality of machine windings and the output load, wherein the inductor is configured to mitigate at least one of current ripple or torque ripple.

3. The electrical system of claim 1, wherein the power inverter comprises a set of semiconductor switches that are configured to convert direct current (DC) power to alternating current (AC) power.

4. The electrical system of claim 3, wherein each semiconductor switch of the set of semiconductor switches comprises a voltage-controlled switching device.

5. The electrical system of claim 4, wherein the voltage-controlled switching device comprises at least one of a silicon insulated gate bipolar transistor (IGBT), a silicon carbide metal-oxide semiconductor field effect transistor (MOSFET), a silicon superjunction MOSFET, a Gallium nitride (GaN) field-effect transistor (FET), a SiC junction-gate field-effect transistor (JFET), a wideband-gap (WBG) device, or an ultra-wideband-gap device (UWBG).

6. The electrical system of claim 3, the power inverter comprising a plurality of phase legs, each phase leg of the plurality of phase legs comprising a pair of semiconductor switches of the set of semiconductor switches, wherein each phase leg is connected to a corresponding phase terminal of the plurality of machine windings of the traction motor.

7. The electrical system of claim 6, wherein current flows through at least two-phase windings of the plurality of machine windings to cause a voltage from the RESS to step down from a first voltage to a second voltage due to pulse-width modulation of the corresponding phase legs.

8. The electrical system of claim 1, wherein the output load comprises at least one of a vehicle or an accessory load.

9. The electrical system of claim 1, wherein the switch comprises at least one of a contactor or a solid-state relay.

10. An electrical system, comprising:
a rechargeable energy storage system (RESS);
a power inverter connected to the RESS, the power inverter configured to provide electrical power to a traction motor;
a plurality of machine windings of the traction motor;
a switch disposed between the plurality of machine windings and an output load; and
a controller connected to the switch and to a power inverter controller, wherein the controller is configured to transmit control signals to the power inverter controller and to the switch to allow current flow from the RESS through two of the plurality of machine windings in series to transfer an energy stored in the two of the plurality of machine windings to the output load during a first operational state, wherein the two of the plurality of machine windings includes at least one of: an La winding and an Lb winding, the La winding and an Lc winding, and the Lb winding and the Lc winding, and to prevent current flow to the output load during a second operational state.

11. The electrical system of claim 10, further comprising an inductor connected in series between the plurality of machine windings and the output load, wherein the inductor is configured to mitigate current ripple.

12. The electrical system of claim 10, wherein the power inverter comprises a set of semiconductor switches that are configured to convert direct current (DC) power to alternating current (AC) power.

13. The electrical system of claim 12, wherein each semiconductor switch of the set of semiconductor switches comprises a voltage-controlled switching device.

14. The electrical system of claim 13, wherein the voltage-controlled switching device comprises at least one of a silicon insulated gate bipolar transistor (IGBT), a silicon carbide metal-oxide semiconductor field effect transistor (MOSFET), a silicon superjunction MOSFET, a Gallium nitride (GaN) field-effect transistor (FET), a SiC junction-gate field-effect transistor (JFET), a wideband-gap (WBG) device, or an ultra-wideband-gap device (UWBG).

15. The electrical system of claim 13, the power inverter comprising a plurality of phase legs, each phase leg of the plurality of phase legs comprising a pair of semiconductor switches of the set of semiconductor switches, wherein each phase leg is connected to a corresponding phase terminal of the plurality of machine windings of the traction motor.

16. The electrical system of claim 15, wherein current flows through at least two-phase windings of the plurality of machine windings to cause a voltage from the RESS to step down from a first voltage to a second voltage due to pulse-width modulation of the corresponding phase legs.

17. The electrical system of claim 10, wherein the controller receives software updates via over-the-air programming.

18. The electrical system of claim 10, wherein the switch comprises at least one of a contactor or a solid-state relay.

19. A method comprising:
determining whether a DC-DC buck mode selection has been received; and
transmitting at least one control signal to power inverter and to a switch to allow current flow from a rechargeable energy storage system (RESS) through two of a plurality of machine windings in series to transfer an energy stored in the two of the plurality of machine windings to an output load during a first operational state, wherein the two of the plurality of machine windings includes at least one of: an La winding and an Lb winding, the La winding and an Lc winding, and the Lb winding and the Lc winding, and to prevent current flow between the RESS and the plurality of machine windings during a second operational state based on the determination.

20. The method of claim 19, wherein the power inverter comprises a set of semiconductor switches that are configured to convert direct current (DC) power to alternating current (AC) power.

* * * * *